(12) United States Patent
Zhao et al.

(10) Patent No.: US 10,331,401 B2
(45) Date of Patent: Jun. 25, 2019

(54) METHOD AND DEVICE FOR ACTIVATING PRESET FUNCTION IN WEARABLE ELECTRONIC TERMINAL

(71) Applicant: Goertek Inc., Weifang, ShanDong (CN)

(72) Inventors: Peijie Zhao, Weifang (CN); Jianguo Zhang, Weifang (CN); Lin Wang, Weifang (CN)

(73) Assignee: GOERTEK INC., Weifang, Shandong (CN)

( * ) Notice: Subject to any disclaimer, the term of this patent is extended or adjusted under 35 U.S.C. 154(b) by 0 days.

(21) Appl. No.: 15/522,997

(22) PCT Filed: Jun. 17, 2016

(86) PCT No.: PCT/CN2016/086228
§ 371 (c)(1),
(2) Date: Apr. 28, 2017

(87) PCT Pub. No.: WO2017/020660
PCT Pub. Date: Feb. 9, 2017

(65) Prior Publication Data
US 2018/0011686 A1    Jan. 11, 2018

(30) Foreign Application Priority Data

Aug. 3, 2015 (CN) .......................... 2015 1 0481232

(51) Int. Cl.
*G06F 3/048* (2013.01)
*G06F 3/16* (2006.01)
(Continued)

(52) U.S. Cl.
CPC .............. *G06F 3/167* (2013.01); *G06F 1/163* (2013.01); *G06F 3/011* (2013.01); *G06F 3/04883* (2013.01)

(58) Field of Classification Search
None
See application file for complete search history.

(56) References Cited

U.S. PATENT DOCUMENTS

| 9,000,887 B2 * | 4/2015 | Linsky | G06F 1/163 |
| | | | 340/5.1 |
| 2007/0265741 A1 * | 11/2007 | Oi | G01O 21/12 |
| | | | 701/23 |

(Continued)

FOREIGN PATENT DOCUMENTS

| CN | 103150117 A | 6/2013 |
| CN | 104380254 A | 2/2015 |

(Continued)

OTHER PUBLICATIONS

International Search Report and Written Opinion issued in PCT/CN2016/086228 dated Sep. 22, 2016.

*Primary Examiner* — Hua Lu
(74) *Attorney, Agent, or Firm* — Arent Fox LLP

(57) ABSTRACT

A method and device for activating a preset function in a wearable electronic terminal are disclosed. The method comprises: setting a quick activation command corresponding to a preset function of the wearable electronic terminal in the electronic terminal, so that the quick activation command responds to the touching operation of predetermined type by the user on the touch screen of the electronic terminal; when the electronic terminal is in a working state, detecting a touching event received by the touch screen and confirming that a touching operation of predetermined type happened; and invoking the quick activation command corresponding to the touching operation of predetermined type so as to activate the corresponding preset function. The technical solutions of the present disclosure can quickly (Continued)

activate the preset function simply by touching operations of predetermined type on the touch screen of the electronic terminal.

11 Claims, 5 Drawing Sheets

(51) Int. Cl.
    *G06F 1/16*         (2006.01)
    *G06F 3/0488*     (2013.01)
    *G06F 3/01*         (2006.01)

(56) References Cited

U.S. PATENT DOCUMENTS

| | | | |
|---|---|---|---|
| 2010/0312297 A1* | 12/2010 | Volpe | A61B 5/0404 607/6 |
| 2015/0160622 A1* | 6/2015 | Kim | G04G 21/02 368/9 |
| 2015/0293590 A1* | 10/2015 | Lehtiniemi | G06F 3/016 715/702 |
| 2015/0338926 A1* | 11/2015 | Park | G06F 3/011 345/156 |
| 2015/0363165 A1* | 12/2015 | Zhou | G06F 3/167 715/728 |
| 2016/0077581 A1* | 3/2016 | Shi | G06F 3/011 340/12.5 |
| 2016/0077582 A1* | 3/2016 | Song | G06F 3/0338 345/173 |
| 2016/0283035 A1* | 9/2016 | Sandblad | G06F 3/0418 |
| 2016/0357221 A1* | 12/2016 | Huh | G06F 1/1652 |
| 2016/0370881 A1* | 12/2016 | Jung | G06F 1/163 |
| 2017/0010670 A1* | 1/2017 | Tanaka | G06F 1/163 |
| 2017/0039410 A1* | 2/2017 | Pi | G06F 1/1643 |
| 2017/0085740 A1* | 3/2017 | Lin | G06T 7/20 |
| 2017/0212210 A1* | 7/2017 | Chen | G01S 5/06 |
| 2017/0336964 A1* | 11/2017 | Kim | G06F 1/163 |

FOREIGN PATENT DOCUMENTS

| | | |
|---|---|---|
| CN | 104615469 A | 5/2015 |
| CN | 105045394 A | 11/2015 |

* cited by examiner

METHOD AND DEVICE FOR ACTIVATING PRESET FUNCTION IN WEARABLE ELECTRONIC TERMINAL

CROSS-REFERENCE TO RELATED APPLICATIONS

This application is a National Stage entry of International Application No.: PCT/CN2016/086228, filed Jun. 17, 2016, which claims priority to Chinese Patent Application No. 201510481232.8, filed Aug. 3, 2015. The disclosure of the priority applications are hereby incorporated in their entirety by reference.

TECHNICAL FIELD

The present disclosure relates to the technical field of computers, and in particular, a method and device for activating a preset function in a wearable electronic terminal.

BACKGROUND

With the development of computer technology, more and more functions of Apps become available. The normal process during the activation of an App is: a user wakes up the electronic terminal, gets access to the menu interface, clicks on the icon of the App and then the executable files corresponding to the icon run.

However, because more and more Apps are installed in the smart terminal, in order to activate an App, the user has to find the icon of the App from a huge number of icons and then click the icon of the App. The situation becomes frustrating especially in a mobile terminal due to the limitation of the screen size: the user always has to browse every page so as to locate the App he needed, which degrades the operation experience of the user.

In summary, the current activation of Apps is inconvenient, especially for the user to constantly take heart rate or speed measurements during exercises. Therefore, there is a need to provide a method for quickly activating an App.

SUMMARY

The present disclosure proposes a method and device for activating a preset function in a wearable electronic terminal in order to solve the problem of miscellaneous activation of Apps in prior art.

In order to achieve the above object, the technical solutions adopted by the embodiments of the present disclosure are as follows:

In order to achieve the above object, the technical solutions of the present disclosure are realized as follows:

In one aspect, the present disclosure provides a method for activating a preset function in a wearable electronic terminal, comprising:

setting a quick activation command corresponding to a preset function of the wearable electronic terminal in the electronic terminal, so that the quick activation command responds to a touching operation of predetermined type by the user on a touch screen of the electronic terminal;

when the electronic terminal is in a working state, detecting a touching event received by the touch screen and confirming that a touching operation of predetermined type happened; and invoking the quick activation command corresponding to the touching operation of predetermined type so as to activate the corresponding preset function.

In another aspect, the present disclosure also provides a device for activating a preset function in a wearable electronic terminal, comprising:

a setting unit for setting a quick activation command corresponding to a preset function of the wearable electronic terminal in the electronic terminal, so that the quick activation command responds to a touching operation of predetermined type by the user on a touch screen of the electronic terminal; and for setting an ending command corresponding to the preset function of the wearable electronic terminal in the electronic terminal, and making the ending command respond to the end or occurrence of the touching operation of predetermined type on the touch screen of the electronic terminal by the user, or respond to the instruction from the preset function;

a detecting unit for detecting a touching event received by the touch screen and confirming that a touching operation of predetermined type happened when the electronic terminal is in a working state; and an activation unit for invoking the quick activation command corresponding to the touching operation of predetermined type, so as to activate the corresponding preset function.

Beneficial effects of the embodiments of the present disclosure are: by setting a quick activation command of the preset function in the technical solutions of the present disclosure, the user can quickly activate the preset function of the electronic terminal through the touching action on the touch screen by a finger or the covering operation on the touch screen by a palm. The preset function can be quickly activated simply by touching operations of predetermined type on the touch screen of the electronic terminal without waking up the electronic terminal by clicking the wake-up key or entering into the desktop menu to find the icon of the function and make a choice. Therefore, the activation operation of the function is simplified. Compared with prior art, the present disclosure simplifies the quick activation operation of the function. This is especially useful for the user doing exercises and makes it greatly convenient for the user to measure heart rates, speed and the like in real time. Thus the user's operation experience is significantly enhanced.

In the preferable implementations, by assisting the determination of the validity of the touching events happened on the touch screen by an action sensor and/or a wearable identification module of the wearable electronic terminal, the present disclosure can prevent the activation of the preset function by an unintended operation on the touch screen and thus further enhance the user's operation experience. Meanwhile, the present disclosure, in combination with a voice input mode, can further assist the determination of the validity of the touching events happened on the touch screen and widen the usage thereof.

BRIEF DESCRIPTION OF THE DRAWINGS

The drawings are intended to provide further understanding of the present disclosure and constitute part of the description. The drawings explain the present disclosure in connection with the embodiments of the present disclosure but in no way limit the present disclosure. In the drawings.

DETAILED EMBODIMENTS

To make the objects, technical solutions and advantages of the present disclosure clear, embodiments of the present disclosure will be described in further detail in connection with the drawings.

Figure 1:
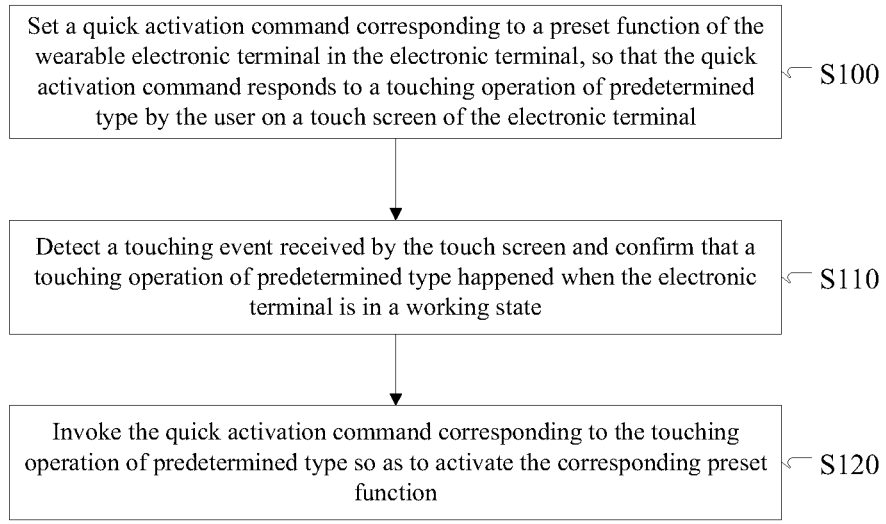
FIG. 1 is a flow diagram for a method for activating a preset function in a wearable electronic terminal provided by Embodiment I of the present disclosure.

Embodiment I:

FIG. 1 is a flow diagram for a method for activating a preset function in a wearable electronic terminal provided by Embodiment I of the present disclosure, wherein the activation method comprises:

S100, a quick activation command corresponding to a preset function of a wearable electronic terminal is set in the electronic terminal, so that the quick activation command responds to the touching operation of predetermined type by the user on the touch screen of the electronic terminal.

The touching operations of predetermined type comprise: a long press operation on the touch screen by a finger and/or a covering operation on the touch screen by a palm.

The preset functions in this step comprise: heart rates measurement, sport tracks recording function, recording, data transmission, synchronous matching function(s), a player, SOS calling function(s), messages, particular information acquisition function(s) from Internet, remote server message sending function(s) as well as modes of sleep or low power consuming, etc.

S110, when the electronic terminal is in a working state, it detects the touching event received by the touch screen and confirms that a touching operation of predetermined type happened.

S120, the quick activation command corresponding to the touching operation of predetermined type is invoked so as to activate the corresponding preset function.

In practice, for certain functions, the user not only has to provide a starting command but also has to explicitly give an ending command, such as the start and end of heart rate measurements as well as the start and end of recording. For certain functions, the user does not have to provide the ending command, such as the voice input mode or data synchronization.

Therefore, in the preferable implementation of this embodiment, the activation method in FIG. 1 also comprises:

setting an ending command corresponding to the preset function of the wearable electronic terminal in the electronic terminal, and the ending command responding to the end or occurrence of the touching operation of predetermined type on the touch screen of the electronic terminal by the user, or responding to the instruction from the preset function.

In one example where the quick activation command of the preset function in the wearable electronic terminal is a long press operation on the touch screen by a finger of the user, the ending command to which the preset function corresponds may respond to the end of the long press operation on the touch screen by the finger of the user, respond to a next long press operation on the touch screen by the finger of the user, or respond to the instruction from the preset function, that is, to the ending command of the preset function itself. In particular, the long press in this embodiment is in terms of particular time. For example, an operation of pressing on the touch screen longer than 200 ms by a finger can be considered as a touching operation of predetermined type in this embodiment.

By setting a quick activation command of the preset function, the user can quickly activate the preset function of the electronic terminal through the touching action on the touch screen by a finger or the covering operation on the touch screen by a palm. The corresponding activation operation can be performed without waking up the electronic terminal or entering into the desktop menu to find the icon option of the function and make a choice. Therefore, the embodiment simplifies the activation operation of the function and enhances the user's operation experience.

The quick activation method of the preset function in the wearable electronic terminal in this embodiment is especially useful for the users doing exercises. The method makes it greatly convenient for the users to measure heart rates, speed and the like in real time.

Figure 2:
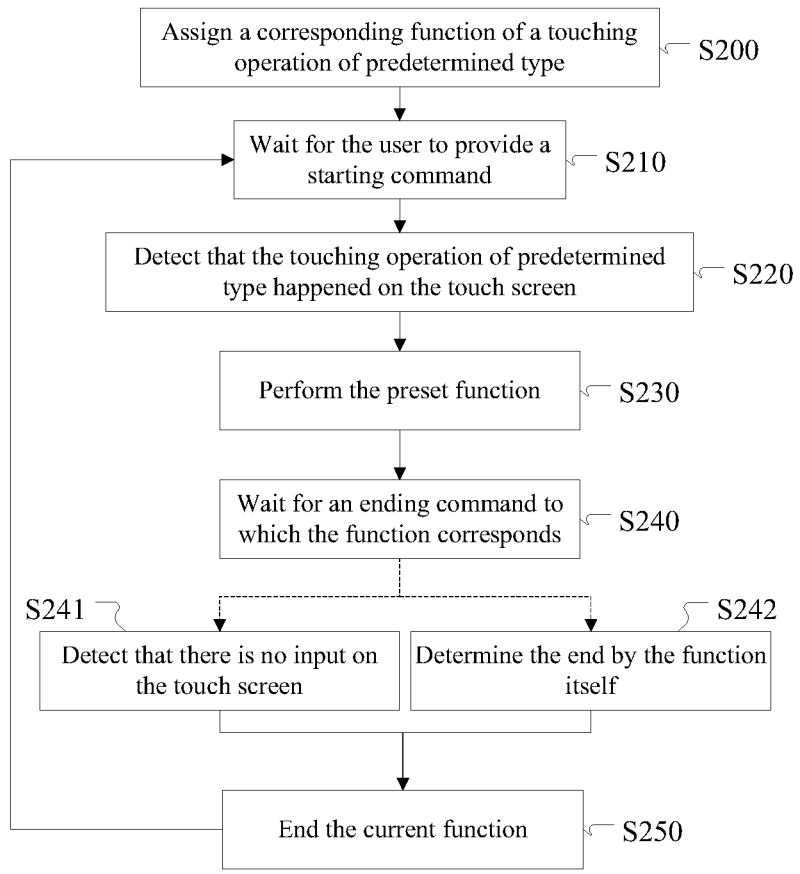
FIG. 2 is a flow diagram for activating a preset function by the quick activation method provided by Embodiment I of the present disclosure.

FIG. 2 is a flow diagram for activating a preset function by the quick activation method provided by Embodiment I and the detailed process is as follows:

S200, assigning a corresponding function of a touching operation of predetermined type.

The corresponding function in this step may be a default one by the system of the wearable electronic terminal or manually set by the user.

The touching operations of predetermined type may be a long press operation on the touch screen by a finger and may be a covering operation on the touch screen by a palm, determined in accordance with the executable content of the preset function.

S210, waiting for the user to provide a starting command, that is, monitoring in real time whether the above touching operation of predetermined type happens on the touch screen of the electronic terminal.

S220, detecting that the touching operation of predetermined type happened on the touch screen.

S230, performing the preset function, that is, invoking the quick activation command corresponding to the above touching operation of predetermined type so as to perform the function to which the quick activation command corresponds.

S240, waiting for an ending command to which the function corresponds.

For the functions that need an ending command explicitly given by the user, such as heart rate measurements, recording etc., step S241 should be performed; whereas for the functions that do not need an ending command given by the user, step S242 should be performed.

S241, detecting that there is no input on the touch screen, which means the detection of the end of the long press operation on the touch screen by the finger of the user or the detection of a next long press operation on the touch screen by the finger of the user.

S242, determining the end by the function itself, which means that the end of the function responds to the ending command from the function itself.

S250, when an ending command is received from the user, ending the current function and jumping to step S210.

Embodiment II:

In the Embodiment I, the quick activation command of the preset function directly responds to the touching operation of predetermined type on the touch screen. The present embodiment reduces the probability of unintended triggering operations by the cooperation of the touching action of predetermined type happened on the touch screen with other hardware resources of the electronic terminal.

In one preferable implementation of the present embodiment, when the hardware resources of the wearable electronic terminal include a wearing identification module such as a distance sensor, a contact sensor or an optical detection based heart rate measurement module, the unintended triggering can be prevented by detecting whether the user wears the electronic terminal.

In the preferable implementation, before the step S120, that is, before invoking the quick activation command corresponding to the touching operation of predetermined type, the activation method of FIG. 1 also comprises, after detecting that the touching operation of predetermined type happened on the touch screen, determining whether the user wears the electronic terminal. If the user wears it, the quick activation command corresponding to the touching operation of predetermined type is invoked; if not, it is determined that the touching operation that happened is an unintended operation and the quick activation command corresponding to the touching operation of predetermined type is not invoked.

In practice, it can assist the determination of whether the touching operation of predetermined type happened on the touch screen is an unintended touch by obtaining the user's wearing data of the electronic terminal, that is, obtaining the data of the above wearing identification module such as the distance sensor, the contact sensor or an optical detection based heart rate measurement module. Specifically, the user's wearing data of the electronic terminal is obtained. When the wearing data indicates that the user wears the electronic terminal, the quick activation command corresponding to the touching operation of predetermined type is invoked; and when the wearing data indicates that the user does not wear the electronic terminal or the wearing data has not been received within a predetermined time threshold, it is determined that the touching operation that happened is an unintended operation and the quick activation command corresponding to the touching operation of predetermined type is not invoked.

In another preferable implementation of the present embodiment, when the hardware resources of the wearable electronic terminal includes an action sensor, the unintended triggering can be prevented by detecting the user's gesture and action using the action sensor.

In the preferable implementation, before the step S120, that is, before invoking the quick activation command corresponding to the touching operation of predetermined type, the activation method of FIG. 1 also comprises, after detecting that the touching operation of predetermined type happened on the touch screen, determining whether the user wears the electronic terminal with a correct gesture. If it is correct, the quick activation command corresponding to the touching operation of predetermined type is invoked; if not, it is determined that the touching operation that happened is an unintended operation and the quick activation command corresponding to the touching operation of predetermined type is not invoked.

In practice, it can assist the determination of whether the touching operation of predetermined type happened on the touch screen is an unintended touch by obtaining the user's wearing gestures data relative to the electronic terminal, that is, obtaining the data of an action sensor. Specifically, the user's wearing gesture data relative to the electronic terminal is obtained. When the wearing gesture data conforms to the corresponding gesture of the preset function, the quick activation command corresponding to the touching operation of predetermined type is invoked; and when the wearing gesture data does not conform to the corresponding gesture of the preset function or the wearing gesture data has not been received within a predetermined time threshold, it is determined that the touching operation that happened is an unintended operation and the quick activation command corresponding to the touching operation of predetermined type is not invoked.

In yet another preferable implementation of the present embodiment, when the wearable electronic terminal includes not only a wearable identification module such as a distance sensor, a contact sensor or an optical detection based heart rate measurement module, but also an action sensor, it can assist the determination of whether the touching operation on the touch screen is an unintended triggering by the combination of wearing identification and wearing gestures.

In the preferable implementation, before the step S120, that is, before invoking the quick activation command corresponding to the touching operation of predetermined type, the activation method of FIG. 1 also comprises, after detecting that the touching operation of predetermined type happened on the touch screen, determining whether the user wears the electronic terminal. If the user wears it, whether the user wears it with a correct gesture is determined. If it is correct, the quick activation command corresponding to the touching operation of predetermined type is invoked; otherwise, it is determined that the user does not wear the electronic terminal, or the user does not wear it with a correct gesture, and it is determined that the touching operation that happened is an unintended operation, then the quick activation command corresponding to the touching operation of predetermined type is not invoked.

In practice, the user's wearing data relative to the electronic terminal may be at first obtained and assists in determining whether the touching operation happened on the touch screen is an unintended action. When it is determined that the user wears an electronic terminal, the user's wearing gesture data relative to the electronic terminal is further obtained and assists in determining whether the touching operation happened on the touch screen is an unintended action. In other words, in the present preferable implementation, it assists the determination of the touching operation on the touch screen by two kinds of hardware resources.

Specifically, after detecting that the touching operation of predetermined type happened on the touch screen, the user's wearing data relative to the electronic terminal is obtained. When the wearing data indicates that the user wears the electronic terminal, the user's wearing gesture data relative to the electronic terminal is further obtained. When the wearing gesture data conforms to the corresponding gesture of the preset function, the quick activation command corresponding to the touching operation of predetermined type is invoked; otherwise, when the wearing data indicates that the user does not wear the electronic terminal, or the wearing data has not been received within a predetermined time threshold, or when the wearing gesture data does not conform to the corresponding gesture of the preset function or the wearing gesture data has not been received within a predetermined time threshold, it is determined that the touching operation that happened is an unintended operation and the quick activation command corresponding to the touching operation of predetermined type is not invoked.

In this embodiment, unintended operations happened on the touch screen can be effectively prevented by utilizing the hardware resources of the wearable electronic terminal.

Figure 3:
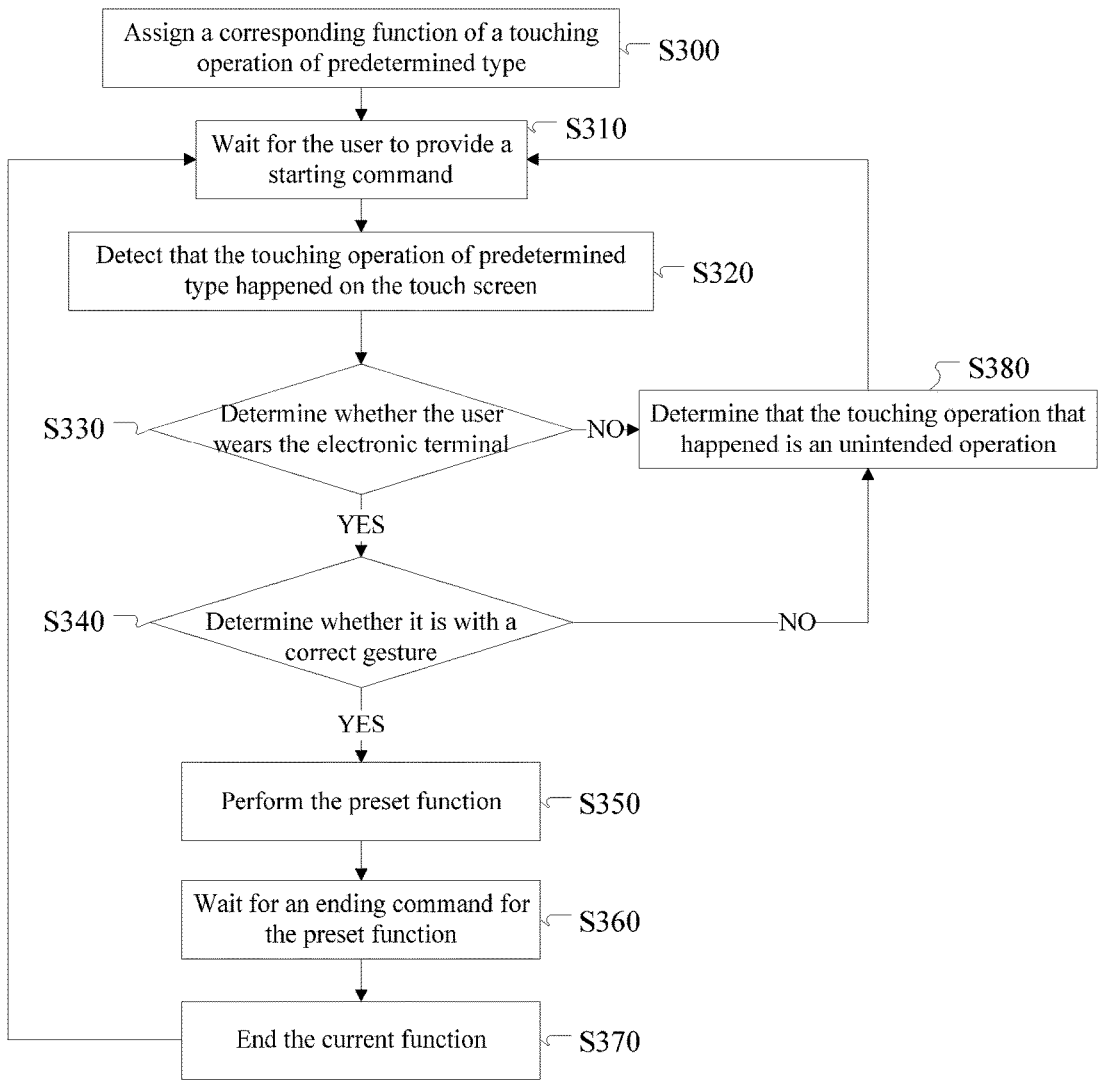
FIG. 3 is a flow diagram for the auxiliary judging method of the effectiveness of the touching event provided by Embodiment II of the present disclosure.

FIG. 3 is a flow diagram for the assistant determination method of the validity of the touching event provided by Embodiment II of the present disclosure. In FIG. 3, the hardware resources for the assistant determination include an action sensor and an optical detection based heart rate measurement module. The method of FIG. 3 comprises in detail:

S300, assigning a corresponding function of a touching operation of predetermined type. In this embodiment, the preset function of the wearable electronic terminal is the function of measuring heart rates.

There are three types of heart rate measuring methods of the wearable electronic terminal: the first one calculates the heart rates based on optically detecting the change of human blood; the second one is based on bioelectrical impedance technology wherein the heart rate is obtained by measuring the resistance difference between two points after introducing a microcurrent into human body; and the third one is based on bioelectrical sensing technology wherein the heart rate is obtained in real time by obtaining the cardiogram through the potential change derived from the body.

For the first and second heart rate measuring method, transmission and reception modules of optics or circuits are normally required. The part of the optics or circuit is arranged in the wearable electronic terminal at the locations near the human body, such as the side surface contacting the arm on the bottom of a wirstwatch. For the third bioelectrical sensing method, in order to ensure obtaining bioelectrical signals from both left and right hands, normally each of the upper and lower faces of the wearable electronic terminal is provided with a metal part such as on the bottom and front of the wirstwatch. With an arm of the user contacting the metal part on the bottom of the watch and at the same time a finger of another hand contacting the metal watch on the front of the watch, the bioelectrical signal carried by the skin is transmitted back to a data processing chip.

S310, waiting for the user to provide a starting command, that is, monitoring in real time whether the above touching operation of predetermined type happens on the touch screen of the electronic terminal.

S320, detecting that the touching operation of predetermined type happened on the touch screen.

The present embodiment takes an example wherein the wearable electronic terminal is worn on the left hand. When the user wears the wearable electronic terminal on the left hand, the user has to contact the touch screen (by a finger long pressing the touch screen) and the metal part (for transmission of the bioelectrical signal) at the same time. The feasible method is either using two fingers of the right hand to contact the touch screen and the metal part of the electrical terminal, or using the right palm to directly and completely cover the front face of the electronic terminal (at this time the palm can contact both the touch screen and the metal part).

S330, obtaining the user's wearing data relative to the electronic terminal by the heart rate measurement module. When the wearing data indicates that the user wears the electronic terminal, step S340 is performed; and when the wearing data indicates that the user does not wear the electronic terminal, step S380 is performed.

S340, obtaining the user's wearing gesture data relative to the electronic terminal by the action sensor. When the wearing gesture data conforms to the corresponding gesture of the function, step S350 is performed; and when the wearing gesture data does not conform to the corresponding gesture of the function, step S380 is performed.

In this step, still take the example that the wearable electronic terminal is worn on the left hand. The electronic terminal determines the position where the electronic terminal is located by the wearing gesture data collected by the action sensor and further determines the position where the wrist wearing the electronic terminal locates. Only when the electronic terminal (or the wrist) locates within a certain angle of the vertical direction and the horizontal direction (the spatial range corresponds to a certain position where the wrist locates relative to the human body, such as being flat in front of the chest), it is determined that the current gesture of the user conforms to the corresponding position for the heart rate measurements.

S350, invoking the quick activation command corresponding to the above touching operation of predetermined type so as to perform the function to which the quick activation command corresponds.

S360, waiting for an ending command to which the function corresponds.

For the function of measuring heart rates, the user is required to explicitly give an ending command. In this step, still take the example that the wearable electronic terminal is worn on the left hand. During the measurement of heart rates, the user's right palm keeps contacting the touch screen and the metal part of the electronic terminal. The ending command of this step responds to the action of the user's right palm leaving the touch screen.

S370, when an ending command is received from the user, ending the current function and jumping to step S310.

S380, determining that the touching operation that happened on the touch screen is an unintended operation and jumping to step S310.

Embodiment III:

In practice, voice input is another important hardware resource. For the activation method of the preset function in the wearable electronic terminal provided by Embodiment I, this embodiment uses voice input as a necessary condition to quickly activate the preset function. Alternatively, voice input itself is the function that the user actually wants to perform.

In this embodiment, the activation method in FIG. 1 also comprises:

establishing an association between a voice input command and the quick activation command of the preset function under the voice input status corresponding to the touching operation of predetermined type of the electronic terminal;

then for step S120 in FIG. 1, invoking the quick activation command corresponding to the touching operation of predetermined type further comprises: after detecting that the touching operation of predetermined type happened on the touch screen, the electronic terminal is controlled so as to shift into a corresponding voice input status; if an identifiable voice input command is received from the user within a predetermined time threshold, the quick activation command associated with the voice input command is invoked.

Figure 4:
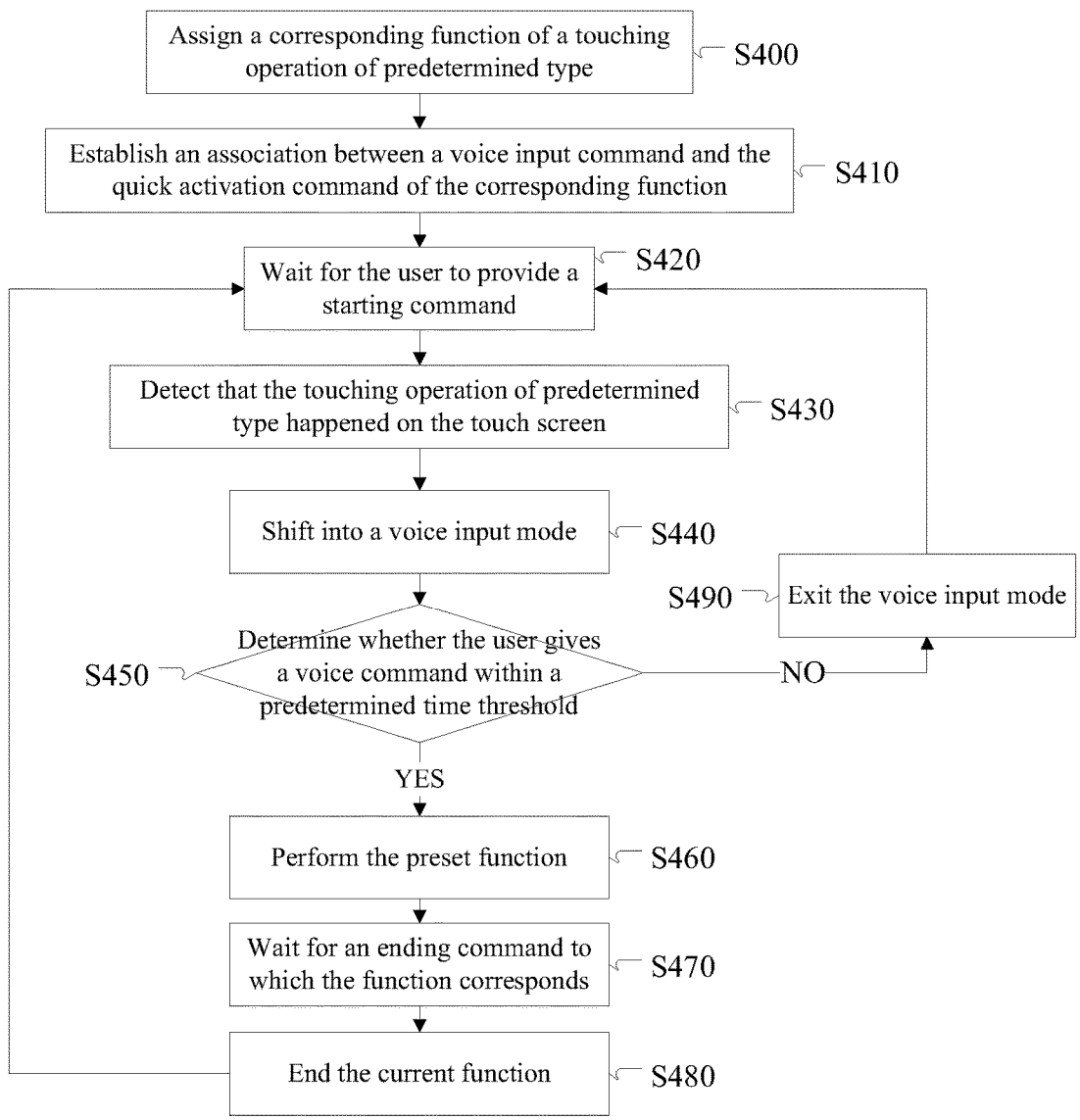
FIG. 4 is a flow diagram for activating a preset function by the quick activation method provided by Embodiment III.

FIG. 4 is a flow diagram for activating a preset function by the quick activation method provided by Embodiment III. The quick activation method of preset function of FIG. 4 requires that, after assigning a corresponding function of a touching operation of predetermined type, establishing the association between a voice input command and the quick activation command of the corresponding function. Therefore, after detecting that the touching operation of predetermined type happened on the touch screen, then shift into a voice input mode; after shifting into the voice input mode, it is determined whether the user gives a voice command within a predetermined time threshold. If a voice command is received from the user within a predetermined time threshold, the corresponding function is performed; and if a voice command has not been received from the user within a predetermined time threshold, exit the voice input mode.

Except steps S410, S440, S450 and S490, other steps that the method for quickly activating a preset function in FIG. 4 involve, such as steps S400, S420, S430 and S460-S480, are generally same as those in the method for quickly activating a preset function in FIG. 2, for which description is not repeated.

Embodiment IV:

Based on the method for quickly activating a preset function in a wearable electronic terminal provided by Embodiment III, this embodiment combines with the determination of whether a touching operation of predetermined type happened on a touch screen is an unintended operation provided by Embodiment II.

In one preferable implementation of the present embodiment, when the hardware resources of the wearable electronic terminal includes a wearable identification module such as a distance sensor, a contact sensor or an optical detection based heart rate measurement module, the unintended triggering can be prevented by detecting whether the uses wears the electronic terminal.

Before the electronic terminal is controlled to shift into the corresponding voice input status, the above activation method also comprises: determining whether the user wears the electronic terminal. If the user wears it, the electronic terminal is controlled to shift into the corresponding voice input status; and if not, it is determined that the touching operation that happened is an unintended operation and the electronic terminal is not shifted into the voice input status.

In practice, it can assist the determination of whether the touching operation of predetermined type happened on the touch screen is an unintended touch by obtaining the user's wearing data relative to the electronic terminal, that is, obtaining the wearing data of the above wearable identification module such as the distance sensor, the contact sensor or an optical detection based heart rate measurement module.

Specifically, the user's wearing data relative to the electronic terminal is obtained. When the wearing data indicates that the user wears the electronic terminal, the electronic terminal is controlled to shift into a corresponding voice input status; and when the wearing data indicates that the user does not wear the electronic terminal or the wearing data has not been received within a predetermined time threshold, it is determined that the touching operation that happened is an unintended operation and the electronic terminal is not shifted into the voice input status.

In another preferable implementation of the present embodiment, when the hardware resources of the wearable electronic terminal includes an action sensor, the unintended triggering can be prevented by detecting the user's gesture and action by the action sensor.

Before the electronic terminal is controlled to shift into the corresponding voice input status, the above activation method also comprises: determining whether the user's wearing gesture relative to the electronic terminal is correct, wherein if it is correct, the electronic terminal is controlled to shift into the corresponding voice input status; and if not, it is determined that the touching operation that happened is an unintended operation and the electronic terminal is not shifted into the voice input status.

In practice, it can assist the determination of whether the touching operation of predetermined type happened on the touch screen is an unintended touch by obtaining the user's wearing gestures data relative to the electronic terminal, that is, obtaining the data of an action sensor.

Specifically, the user's wearing gesture data relative to the electronic terminal is obtained. When the wearing gesture data conforms to the corresponding gesture of the preset function, the electronic terminal is controlled to shift into a corresponding voice input status; and when the wearing gesture data does not conform to the corresponding gesture of the preset function or the wearing gesture data relative to the electronic terminal has not been received within a predetermined time threshold, it is determined that the touching operation that happened is an unintended operation and the electronic terminal is not shifted into a voice input status.

In yet another preferable implementation of the present embodiment, when the wearable electronic terminal includes not only a wearing identification module such as a distance sensor, a contact sensor or an optical detection based heart rate measurement module, but also an action sensor, it can assist the determination of whether the touching operation happened on the touch screen is an unintended triggering by the combination of wearing identification and wearing gestures.

Before the electronic terminal is controlled to shift into the corresponding voice input status, the above activation method also comprises: determining whether the user wears the electronic terminal. If the user wears it, then whether the user's wearing gesture relative to the electronic terminal is correct is further determined. If it is correct, the electronic terminal is controlled to shift into the corresponding voice input status; otherwise it is determined that the user does not wear the electronic terminal, or if the user's wearing gesture relative to the electronic terminal is not correct, it is determined that the touching operation that happened is an unintended operation and the electronic terminal is not shifted into the voice input status.

In practice, the user's wearing data relative to the electronic terminal may be at first obtained and assist in determining whether the touching operation happened on the touch screen is an unintended action. When it is determined that the user wears an electronic terminal, the user's wearing gesture data relative to the electronic terminal is further obtained and assists in determining whether the touching operation happened on the touch screen is an unintended action. In other words, in the present preferable implementation, it assists the determination of the touching operation on the touch screen is done by two kinds of hardware resources.

Specifically, the user's wearing data relative to the electronic terminal is obtained. When the wearing data indicates that the user wears the electronic terminal, the user's wearing gesture data relative to the electronic terminal is further obtained. When the wearing gesture data conforms to the corresponding gesture of the preset function, the electronic terminal is controlled to shift into a corresponding voice input status; otherwise, when the wearing data indicates that the user does not wear the electronic terminal, or the wearing data has not been received within a predetermined time threshold, or when the wearing gesture data does not conform to the corresponding gesture of the preset function or the wearing gesture data relative to the electronic terminal has not been received within a predetermined time threshold, it is determined that the touching operation that happened is an unintended operation and the electronic terminal is not shifted into a voice input status.

Figure 5:
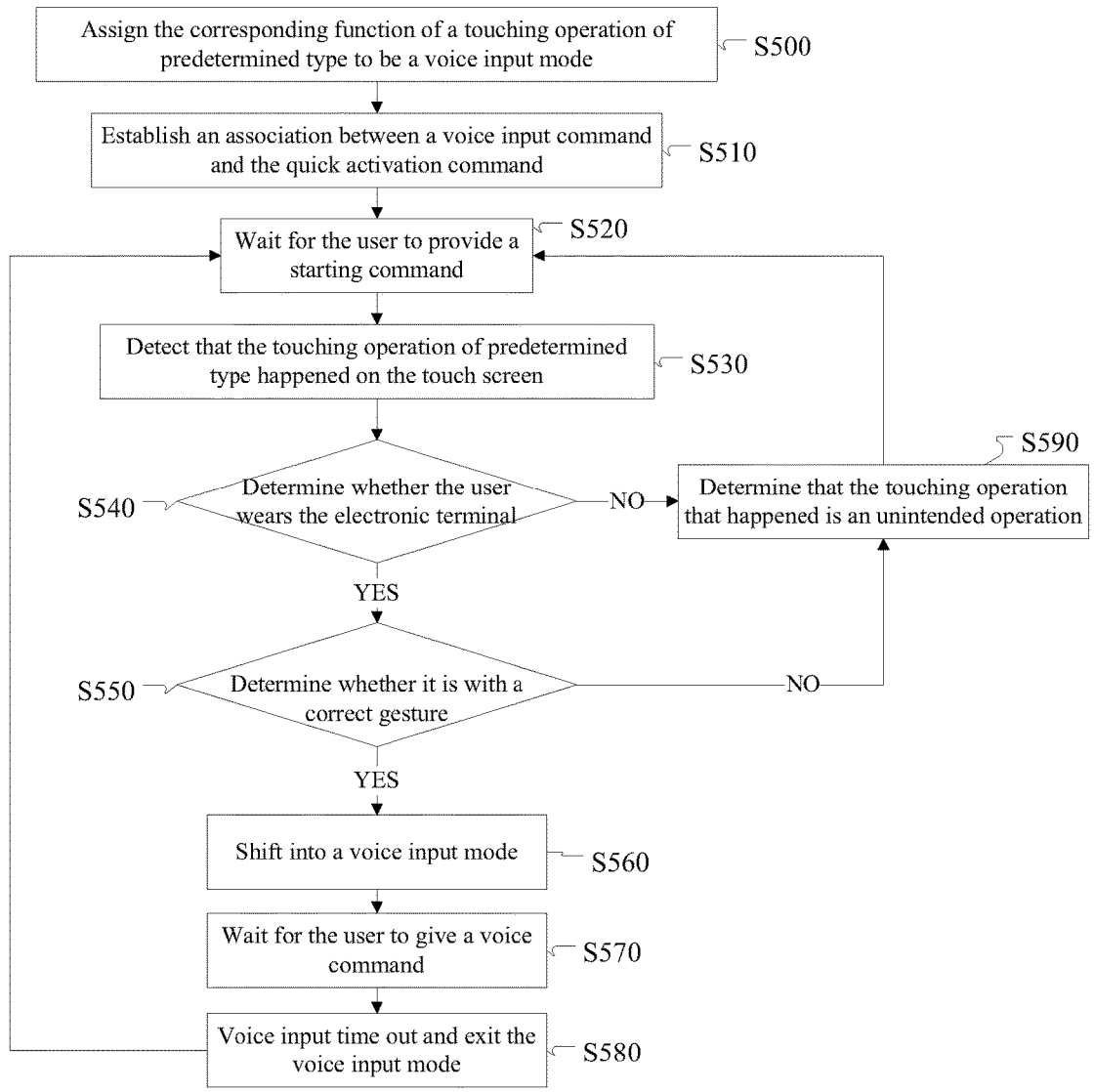
FIG. 5 is a flow diagram for the auxiliary judging method of the effectiveness of the touching event provided by Embodiment IV of the present disclosure.

FIG. 5 is a flow diagram for the assistant determination method of the validity of the touching event provided by Embodiment IV of the present disclosure. In FIG. 5, the hardware resources for the assistant determination include an action sensor and an optical detection based heart rate measurement module. The method of FIG. 5 comprises in detail:

S500, assigning the corresponding function of the touching operation of predetermined type. In this embodiment, the corresponding function of the touching operation of predetermined type is a voice input mode, that is, voice input itself is the function that the user actually wants to perform;

S510, establishing the association between the quick activation command and the voice input command;

S520, waiting for the user to provide a starting command, that is, monitoring in real time whether the above touching operation of predetermined type happens on the touch screen of the electronic terminal;

S530, detecting that the touching operation of predetermined type happened on the touch screen;

S540, determining whether the user wears the electronic terminal, that is, obtaining the user's wearing data relative to the electronic terminal by the heart rate measurement module; when the wearing data indicates that the user wears the electronic terminal, step S550 is performed; and when the wearing data indicates that the user does not wear the electronic terminal, step S590 is performed;

S550, obtaining the user's wearing gesture data relative to the electronic terminal by the action sensor; when the wearing gesture data conforms to the corresponding gesture of the function, step S560 is performed; and when the wearing gesture data does not conform to the corresponding gesture of the function, step S590 is performed;

S560, shifting into the voice input mode;

S570, waiting for the user to give a voice command;

S580, exiting the voice input mode when the voice input timeout and performing step S520; and S590, determining the touching operation that happened is an unintended operation and performing step S520.

Embodiment V:

Based on the same technical concept in the Embodiments I, II, III or IV, the present disclosure also provides a device for activating a preset function in a wearable electronic terminal.

Figure 6:
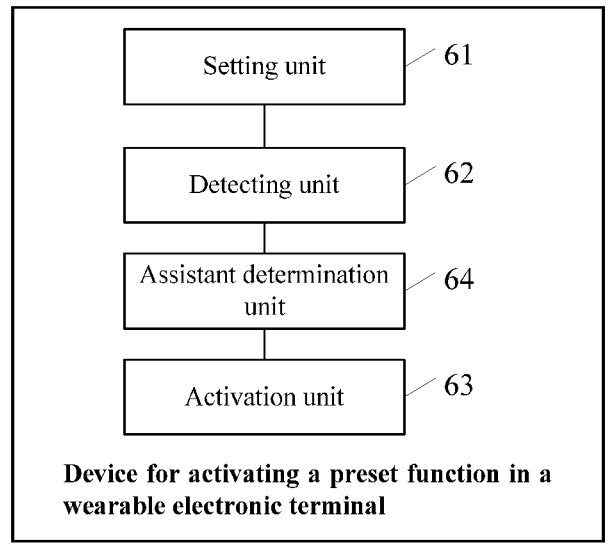
FIG. 6 is a structural schematic view of a device for activating a preset function in a wearable electronic terminal provided by Embodiment V of the present disclosure.

FIG. 6 is a structural schematic view of a device for activating a preset function in a wearable electronic terminal provided by Embodiment V of the present disclosure. The activation device in FIG. 6 comprises: a setting unit 61, a detecting unit 62 and an activation unit 63.

The setting unit 61 is for setting a quick activation command corresponding to a preset function of the wearable electronic terminal in the electronic terminal, so that the quick activation command responds to a touching operation of predetermined type by the user on a touch screen of the electronic terminal; and for setting an ending command corresponding to the preset function of the wearable electronic terminal in the electronic terminal, so that the ending command responds to the end or occurrence of the touching operation of predetermined type on the touch screen of the electronic terminal by the user, or responds to the command from the preset function. In particular, the preset functions comprise: heart rates measurement, sport tracks recording function, recording, data transmission, synchronous matching function, a player, SOS calling function, messages, particular information acquisition function from Internet, remote server message sending function as well as modes of sleep or low power consuming.

The detecting unit 62 is for detecting the touching event received by the touch screen and confirming that a touching operation of predetermined type happened when the electronic terminal is working; wherein the touching operations of predetermined type comprise: a long press operation on the touch screen by a finger and/or a covering operation on the touch screen by a palm.

The activation unit 63 is for invoking the quick activation command corresponding to the touching operation of predetermined type, so as to activate the corresponding preset function.

By setting a quick activation command of the preset function by the setting unit in the device of the embodiment, the user can quickly activate the preset function of the electronic terminal through the touching action on the touch screen by a finger or the covering operation on the touch screen by a palm. The corresponding activation operation can be performed without waking up the electronic terminal or entering into the desktop menu to find the icon of the function and make a choice. Therefore, the embodiment simplifies the activation operation of the function and enhances the user's operation experience.

Preferably, the wearable electronic terminal in this embodiment is a smart watch with an action sensor.

If the activation unit 63 activates the preset function simply according to the touching operation of predetermined type happened on the touch screen detected by the detecting unit, an unintended trigger will easily happen.

In the preferable implementation of the present embodiment, the device of FIG. 6 also comprises an assistant determination unit 64.

After detecting that the touching operation of predetermined type happened on the touch screen, the assistant determination unit 64 determines whether the user wears the electronic terminal. If the user wears it, the quick activation command corresponding to the touching operation of predetermined type is invoked; if not, it is determined that the touching operation that happened is an unintended operation and the quick activation command corresponding to the touching operation of predetermined type is not invoked.

Alternatively, after detecting that the touching operation of predetermined type happened on the touch screen, the unit 64 determines whether the user wears the electronic terminal with a correct gesture. If it is correct, the quick activation command corresponding to the touching operation of predetermined type is invoked; if not, it is determined that the touching operation that happened is an unintended operation and the quick activation command corresponding to the touching operation of predetermined type is not invoked.

Alternatively, after detecting that the touching operation of predetermined type happened on the touch screen, the unit 64 determines whether the user wears the electronic terminal. If the user wears it, whether the user wears the electronic terminal with a correct gesture is further determined. If it is correct, the quick activation command corresponding to the touching operation of predetermined type is invoked; otherwise, it is determined that the user does not wear the electronic terminal, or the user does not wear it with a correct gesture, and it is determined that the touching operation that happened is an unintended operation, then the quick activation command corresponding to the touching operation of predetermined type is not invoked.

The above preferable implementation of this embodiment can effectively prevent the unintended operation on the touch screen.

In another preferable implementation of this embodiment, the device of FIG. 6 also comprises an association unit for establishing the association between a voice input command and the quick activation command of the preset function under the voice input status corresponding to the touching operation of predetermined type of the electronic terminal;

Then after detecting that the touching operation of predetermined type happened on the touch screen, the activation unit 63 controls the electronic terminal to shift into a corresponding voice input status; if an identifiable voice input command is received from the user within a predetermined time threshold, the quick activation command associated with the voice input command is invoked;

Then the assistant determination unit 64 further determines whether the user wears the electronic terminal; if the user wears it, the electronic terminal is controlled to shift into the corresponding voice input status; and if not, it is determined that the touching operation that happened is an unintended operation and the electronic terminal is not shifted into the voice input status; or the assistant determination unit 64 further determines whether the user's wearing gesture relative to the electronic terminal is correct; if it is correct, the electronic terminal is controlled to shift into the corresponding voice input status; and if not, it is determined that the touching operation that happened is an unintended operation and the electronic terminal is not shifted into the voice input status; or the assistant determination unit 64 further determines whether the user wears the electronic terminal. If the user wears it, then whether the user's wearing gesture relative to the electronic terminal is correct is further determined. If it is correct, the electronic terminal is controlled to shift into the corresponding voice input status; otherwise it is determined that the user does not wear the electronic terminal, or the user's wearing gesture relative to the electronic terminal is not correct, and it is determined that the touching operation that happened is an unintended operation and the electronic terminal is not shifted into the voice input status.

In summary, by setting a quick activation command of the preset function in the technical solutions of the present disclosure, the user can quickly activate the preset function of the electronic terminal through the touching action on the touch screen by a finger or the covering operation on the touch screen by a palm. The preset function can be quickly activated simply by touching operations of predetermined type on the touch screen of the electronic terminal without waking up the electronic terminal by clicking the wake-up key or entering into the desktop menu to find the icon of the function and make a choice. Therefore, the activation operation of the function is simplified. Compared with prior art, the present disclosure simplifies the quick activation operation of the function. This is especially useful for the user doing exercises and makes it greatly convenient for the user to measure heart rates, speed and the like in real time. Thus the user's operation experience is significantly enhanced. In the preferable implementations, by assisting the determination of the validity of the touching events on the touch screen by an action sensor and/or a wearable identification module of the wearable electronic terminal, the present disclosure can prevent the activation of the preset function by an unintended trigger on the touch screen and thus further enhance the user's operation experience. Meanwhile, the present disclosure, in combination with a voice input mode, can further assist the determination of the validity of the touching events happened on the touch screen and widen the usage thereof.

Each part embodiment of the present disclosure can be implemented by hardwares, software modules run on one or more processors or the combination thereof. Those skilled in the art will understand that some or all functions of some or all parts of the apparatus based on the activation device of the preset function of the wearable electronic terminal according to the embodiments of the present disclosure can be implemented by microprocessors or digital signal processors (DSPs). The present disclosure can also be carried out as a program (e.g. computer program and computer program product) for an apparatus or a device for implementing a part or the whole method described here. The program thus implementing the present disclosure can be stored on a computer-readable medium, or can take the form of one or more signals. Such signals can be obtained by downloading from Internet, can be provided on a carrier signal, or can be provided in other form.

Figure 7:
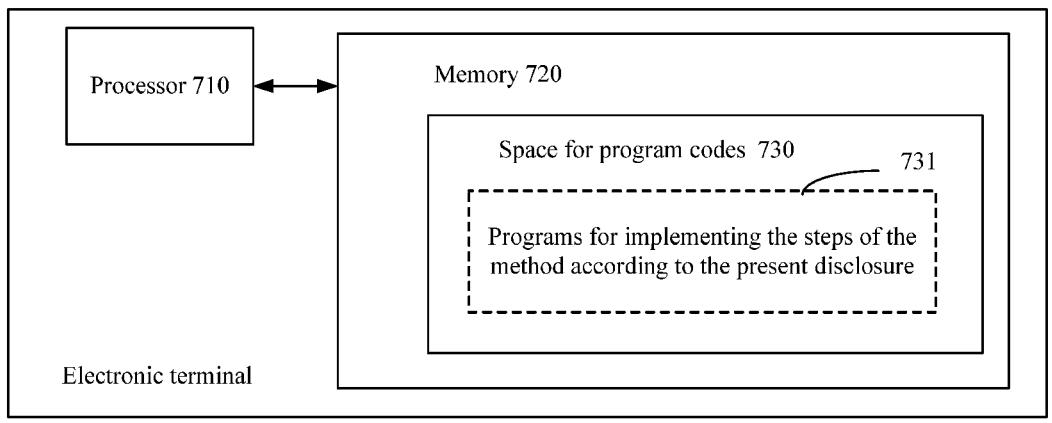
FIG. 7 illustrates a block diagram of a terminal apparatus for performing the method according to the present disclosure.
Figure 8:
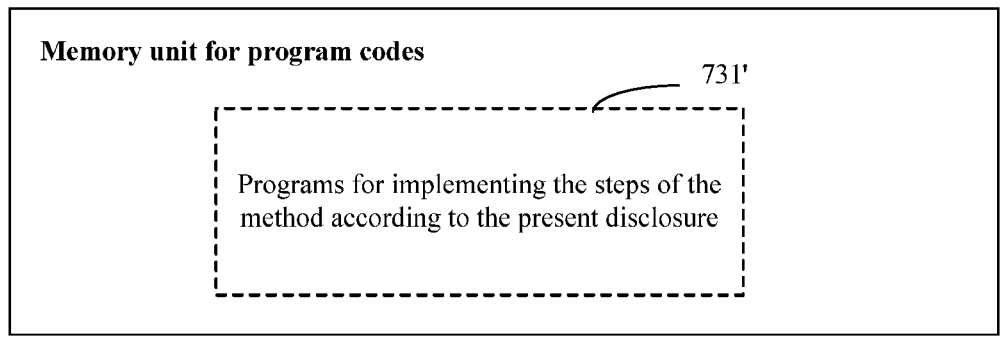
FIG. 8 illustrates a storage unit for storing or carrying a program code for performing the method according to the present disclosure.

For example, FIG. 7 schematically illustrates a block diagram of a terminal apparatus for performing the method according to the present disclosure. The terminal apparatus includes a processor 710 and a computer program product or a computer-readable medium in form of a memory 720. The memory 720 can be any electronic memory such as flash, EEPROMs (Electrically Erasable Programmable Read Only Memory), EPROMs, hard disks or ROMs. The memory 720 has a storage space 730 of the program code 731 for implementing any method step of the above methods. For example, the program space 730 for the program code may include individual program codes 731 for implementing respective step of the above methods. These program codes can be read from or written into one or more computer program products. These computer program products include program code carriers such as hard disks, compact disks (CDs), memory cards, floppy disks and the like. Normally, these computer program products are a portable or fixed memory unit as shown in FIG. 8. Such a memory unit may have storing fields, storing space or the like provided as the type of memory 720 in the terminal apparatus in FIG. 7. The program code can be compacted in a suitable form. Typically, the memory unit includes computer-readable codes 731', that is, codes that can be read by a process such as 710. These codes, when run by the terminal apparatus, make the terminal apparatus implement the individual steps in the above method.

The above described is merely best embodiments of the present disclosure and is not intended to limit the protection scope of the present disclosure. Any modification, equivalent alternation and development made within the scope and principle of the present disclosure shall fall within the protection scope of the present disclosure.

The invention claimed is:

1. A method for activating a preset function in a wearable electronic terminal, wherein the wearable electronic terminal is carried by a user doing exercises, and the method comprises:

setting a quick activation command corresponding to a preset function of the wearable electronic terminal in the electronic terminal, so that the quick activation command responds to a touching operation of predetermined type by the user on a touch screen of the electronic terminal;

when the electronic terminal is in a working state, detecting a touching event received by the touch screen and confirming that a touching operation of predetermined type happened; and after detecting that the touching operation of predetermined type happened on the touch screen, determining whether the user wears the electronic terminal, if the user wears it, further determining whether the user wears the electronic terminal with a correct gesture, wherein when the spatial range where the electronic terminal locates corresponds to a certain position where the wrist locates relative to the human body, it is determined the user wears the electronic terminal with a correct gesture, and then determining that the touching operation is not an unintended triggering, invoking the quick activation command corresponding to the touching operation of predetermined type so as to activate the corresponding preset function, otherwise determining that the touching operation is an unintended triggering, not invoking the quick activation command corresponding to the touching operation of predetermined type.

2. The method according to claim 1, wherein the method also comprises:

setting an ending command corresponding to the preset function of the wearable electronic terminal in the electronic terminal, and making the ending command respond to the end or occurrence of the touching operation of predetermined type on the touch screen of the electronic terminal by the user, or respond to an instruction from the preset function.

3. The method according to claim 1, wherein the method also comprises:

establishing an association between a voice input command and the quick activation command of the preset function, under a voice input status corresponding to the touching operation of predetermined type of the electronic terminal;

then invoking the quick activation command corresponding to the touching operation of predetermined type also comprising:

after detecting that the touching operation of predetermined type happened on the touch screen, controlling the electronic terminal to shift into a corresponding voice input status; if an identifiable voice input command is received from the user within a predetermined time threshold, the quick activation command associated with the voice input command is invoked.

4. The method according to claim 3, wherein before controlling the electronic terminal to shift into a corresponding voice input status, the method also comprises:

determining whether the user wears the electronic terminal, and if the user wears it, the electronic terminal is controlled to shift into the corresponding voice input status; and if the user does not wears it, it is determined that the touching operation that happened is an unintended operation and the electronic terminal is not shifted into the voice input status; or determining whether the user's wearing gesture relative to the electronic terminal is correct, and if it is correct, the electronic terminal is controlled to shift into the corresponding voice input status; and if not, it is determined that the touching operation that happened is an unintended operation and the electronic terminal is not shifted into the voice input status; or determining whether the user wears the electronic terminal, and if the user wears it, then further determining whether the user's wearing gesture relative to the electronic terminal is correct, and if it is correct, the electronic terminal is controlled to shift into the corresponding voice input status; otherwise it is determined that the user does not wear the electronic terminal, or the user's wearing gesture relative to the electronic terminal is not correct, it is determined that the touching operation that happened is an unintended operation and the electronic terminal is not shifted into the voice input status.

5. The method according to claim 1, wherein the preset function includes a heart rate measuring function, and each of the upper and lower faces of the wearable electronic terminal is provided with a metal part;

the detecting that the touching operation of predetermined type happened on the touch screen comprise: detecting that there is a long press operation on the touch screen by a finger of the user, and two fingers of the user contact the touch screen and the metal part of the electrical terminal respectively;

and/or, the detecting that the touching operation of predetermined type happened on the touch screen comprise: detecting that there is a covering operation on the touch screen by a palm of the user, and the palm of the user contact the touch screen and the metal part of the electronic terminal at the same time.

6. A device for activating a preset function in a wearable electronic terminal, wherein the wearable electronic terminal is carried by a user doing exercises, and the device comprises a processor, which is configured for:

setting a quick activation command corresponding to a preset function of the wearable electronic terminal in the electronic terminal, so that the quick activation command responds to a touching operation of predetermined type by the user on a touch screen of the electronic terminal;

detecting a touching event received by the touch screen and confirming that a touching operation of predetermined type happened when the electronic terminal is in a working state; and after detecting that the touching operation of predetermined type happened on the touch screen, determining whether the user wears the electronic terminal, if the user wears it, further determining whether the user wears the electronic terminal with a correct gesture, wherein when the spatial range where the electronic terminal locates corresponds to a certain position where the wrist locates relative to the human body, it is determined the user wears the electronic terminal with a correct gesture, and then determining that the touching operation is not an unintended triggering, invoking the quick activation command corresponding to the touching operation of predetermined type, so as to activate the corresponding preset function, otherwise determining that the touching operation is an unintended triggering, not invoking the quick activation command corresponding to the touching operation of predetermined type.

7. The device according to claim 6, wherein the processor is also configured for:

setting an ending command corresponding to the preset function of the wearable electronic terminal in the electronic terminal, and making the ending command respond to the end or occurrence of the touching operation of predetermined type on the touch screen of the electronic terminal by the user, or respond to the instruction from the preset function.

8. The device according to claim 6, wherein the processor is further configured for:

establishing an association between the voice input command and the quick activation command of the preset function, under a voice input status corresponding to the touching operation of predetermined type of the electronic terminal; and after detecting that the touching operation of predetermined type happened on the touch screen, controlling the electronic terminal to shift into a corresponding voice input status and invoking the quick activation command associated with the voice input command if an identifiable voice input command is received from the user within a predetermined time threshold.

9. The device according to claim 8, wherein before controlling the electronic terminal to shift into a corresponding voice input status, the processor is further configured for:

determining whether the user wears the electronic terminal, if the user wears it, control the electronic terminal to shift into the corresponding voice input status; and if the user does not wears it, determining that the touching operation that happened is an unintended operation and the electronic terminal is not shifted into the voice input status; or determining whether the user's wearing gesture relative to the electronic terminal is correct, and if it is correct, controlling the electronic terminal to shift into the corresponding voice input status; and if not, determining that the touching operation that happened is an unintended operation and the electronic terminal is not shifted into the voice input status; or determining whether the user wears the electronic terminal, and if the user wears it, then further determining whether the user's wearing gesture relative to the electronic terminal is correct, if it is correct, control the electronic terminal to shift into the corresponding voice input status; otherwise determining that the user does not wear the electronic terminal, or the user's wearing gesture relative to the electronic terminal is not correct, and determining that the touching operation that happened is an unintended operation and the electronic terminal is not shifted into the voice input status.

10. The device according to claim 6, wherein the wearable electronic terminal is a smart watch; and wherein the preset functions comprise: heart rates measurement function, sport tracks recording function, recording function, data transmission function, data synchronous matching function, player, SOS calling function, messages, particular information acquisition function from Internet, remote server message sending function as well as modes of sleep or low power consuming.

11. The device according to claim 6, wherein the preset function includes a heart rate measuring function, and each of the upper and lower faces of the wearable electronic terminal is provided with a metal part;

the detecting that the touching operation of predetermined type happened on the touch screen comprise: detecting that there is a long press operation on the touch screen by a finger of the user, and two fingers of the user contact the touch screen and the metal part of the electrical terminal respectively;

and/or, the detecting that the touching operation of predetermined type happened on the touch screen comprise: detecting that there is a covering operation on the touch screen by a palm of the user, and the palm of the user contact the touch screen and the metal part of the electronic terminal at the same time.

* * * * *